Aug. 19, 1969 M. RABINOWITZ ET AL 3,462,573

VACUUM-TYPE CIRCUIT INTERRUPTERS USING GALLIUM OR GALLIUM ALLOYS AS BRIDGING CONDUCTING MATERIAL

Filed Oct. 14, 1965 6 Sheets-Sheet 1

WITNESSES

Theodore F. Wrobel

James F. Young

INVENTORS
Mario Rabinowitz
& Russell E. Fox
BY
Willard R. Crout
ATTORNEY

Aug. 19, 1969 M. RABINOWITZ ET AL 3,462,573

VACUUM-TYPE CIRCUIT INTERRUPTERS USING GALLIUM OR GALLIUM ALLOYS AS BRIDGING CONDUCTING MATERIAL

Filed Oct. 14, 1965 6 Sheets-Sheet 4

VACUUM-TYPE CIRCUIT INTERRUPTERS USING GALLIUM OR GALLIUM ALLOYS AS BRIDGING CONDUCTING MATERIAL

Filed Oct. 14, 1965

United States Patent Office 3,462,573

Patented Aug. 19, 1969

3,462,573

VACUUM-TYPE CIRCUIT INTERRUPTERS USING GALLIUM OR GALLIUM ALLOYS AS BRIDGING CONDUCTING MATERIAL

Mario Rabinowitz, Menlo Park, Calif., and Russell E. Fox, Pittsburgh, Pa., assignors to Westinghouse Electric Corporation, Pittsburgh, Pa., a corporation of Pennsylvania Filed Oct. 14, 1965, Ser. No. 496,008

Int. Cl. H01h 29/06, 33/66

U.S. Cl. 200—152 8 Claims

ABSTRACT OF THE DISCLOSURE

A vacuum-type circuit interrupter has a pair of spaced fixed contacts exposed to the interior of an evacuated envelope containing gallium, which conductively bridges the contacts. Magnetic means, creating a transverse magnetic field, uses the Lorentz force principle to expel the gallium liquid away from the spaced fixed contacts into a collecting chamber to open the circuit.

This invention relates, generally, to vacuum-type circuit interrupters and, more particularly, to improved vacuum-type circuit interrupters using a pair of fixed electrodes, or contacts and having the liquid metal gallium, or liquid gallium alloys, as the bridging conducting material between the aforesaid electrodes or contacts, and is applicable to both direct current and alternating current circuits.

A general object of the present invention is to provide an improved vacuum-type circuit interrupter having remarkable interrupting characteristics and of simplified construction.

Another object of the present invention is the provision of an improved vacuum-type circuit interrupter having a long operational life with practically no maintenance.

Still a further object of the present invention is the provision of an improved vacuum-type circuit interrupter having a pair of spaced electrodes, or contacts, and gallium, or liquid gallium alloys, as an interconnecting conducting liquid medium, with the further use of a magnetic field to effect opening of the circuit interrupter by an expelling, or forcing of the bridging conducting gallium out of the inter-electrode space to an adjacent collecting chamber.

It is a further object of the present invention to provide an improved circuit interrupter of the type set forth in the immediately preceding paragraph, in which novel means are provided for effecting reclosure of the circuit interrupter by utilizing spaced contacts, or electrodes in the collecting chamber with the provision of a magnetic field for forcing, or throwing the liquid metallic gallium from the collecting chamber back into the initial closed position between the spaced electrodes, for effecting reclosure of the circuit interrupter.

Still a further object of the present invention is the provision of an improved simplified-type vacuum circuit interrupter using gallium, or gallium alloys, as a bridging conducting material.

Another object of the present invention is the provision of an improved simplified-type of vacuum circuit interrupter in which a portion of the series circuit may be used to effect energization of the magnetic field for expelling the liquid gallium out of the region between the spaced electrodes or contacts. This will avoid the necessity for utilizing an additional energy source.

We are aware of prior-art devices utilizing gallium, or gallium alloys, as a bridging conducting medium in an evacuated envelope between spaced electrodes, as set forth in Swinne U.S. Patent 1,948,687, issued Feb. 27, 1934, and assigned to the assignee of the instant application; but we propose to improve and simplify the gallium-type circuit interrupters, as exemplified in the aforesaid patent, by the utilization of magnetic means for not only effecting a rapid opening operation, but, additionally, utilizing magnetic means for bringing about a rapid reclosure of the interrupter. In addition, we propose to improve the interrupting structures.

Furthermore, because of the apparatus construction disclosed in U.S. Patent 1,948,687, the use of materials, such as glass, which is wetted by gallium, and other factors, the device there shown is essentially a low-capacity switch, and not suitable for power circuit breakers with capabilities of interrupting many thousands of volts and high amperages.

The element gallium is remarkable for its ability to produce an extremely low contact resistance with a contact, and because of its extremely low vapor pressure at temperatures from below room temperature up to temperatures of hundreds of degrees centigrade. This is extremely important as applied to vacuum-type circuit interrupters, in which it is desired to have a minimum of vapor between the spaced electrodes, or contacts during that portion of the opening operation after the current goes to zero in alternating-current use. As a result, gallium has a considerable advantage in that a high amount of energy may be interrupted because the very low vapor pressure allows for a very rapid recovery of the dielectric strength in the arc gap and fast arc extinction. Also, the relatively low ionization potential helps to keep the arcing voltage low. In addition, the relatively high sticking coefficient of gallium vapor atoms helps to interrupt the arc by quickly removing vapor from the arc gap. The fact that gallium changes from a solid to the fluid form only when it reaches a temperature of about 30° C., is no substantial drawback, because it is easy to provide an auxiliary heating means to maintain the gallium at a temperature above its solidification point. As a source of electric energy is always available when gallium is used for electrical circuit-breaker use, it is desirable, for certain applications, to utilize electric heaters, which are commercially efficient, and may also be easily adapted to the device.

According to a particular aspect of the instant invention, there is provided an evacuated envelope of a material not wetted by gallium having projecting therewithin a pair of spaced line contacts, or electrodes. Liquid metal gallium, or a low-vapor-pressure liquid metal gallium alloy, is utilized to effect a bridging conducting relationship between the aforesaid pair of spaced electrodes, or contacts; and magnetic means, either separately energized, or deriving its energy from the series circuit, is employed to effect a physical throwing, or expelling of the liquid metal gallium, or low-vapor-pressure metallic gallium alloy, out of the inter-electrode region to an adjacently disposed collecting chamber. Because of the extremely low vapor pressure of the gallium, or the gallium alloy, circuit interruption and arc extinction are rapidly achieved.

In accordance with a further aspect of the instant invention, there is provided a pair of spaced contacts, or electrodes within the collecting chamber, which are bridged electrically by the liquid metal gallium, or its alloys, in the closed-circuit position of the device; and additional magnetic means is preferably employed to effect reclosure of the gallium switch by an expulsion, or forcing of the liquid metal gallium out of the collecting chamber to its original position between the line contacts, thereby bringing about a reclosure of the circuit through the device.

Further objects and advantages will readily become apparent upon reading the following specification, taken in conjunction with the drawings, in which.

Figures 10, 11, 12, 13, 14:
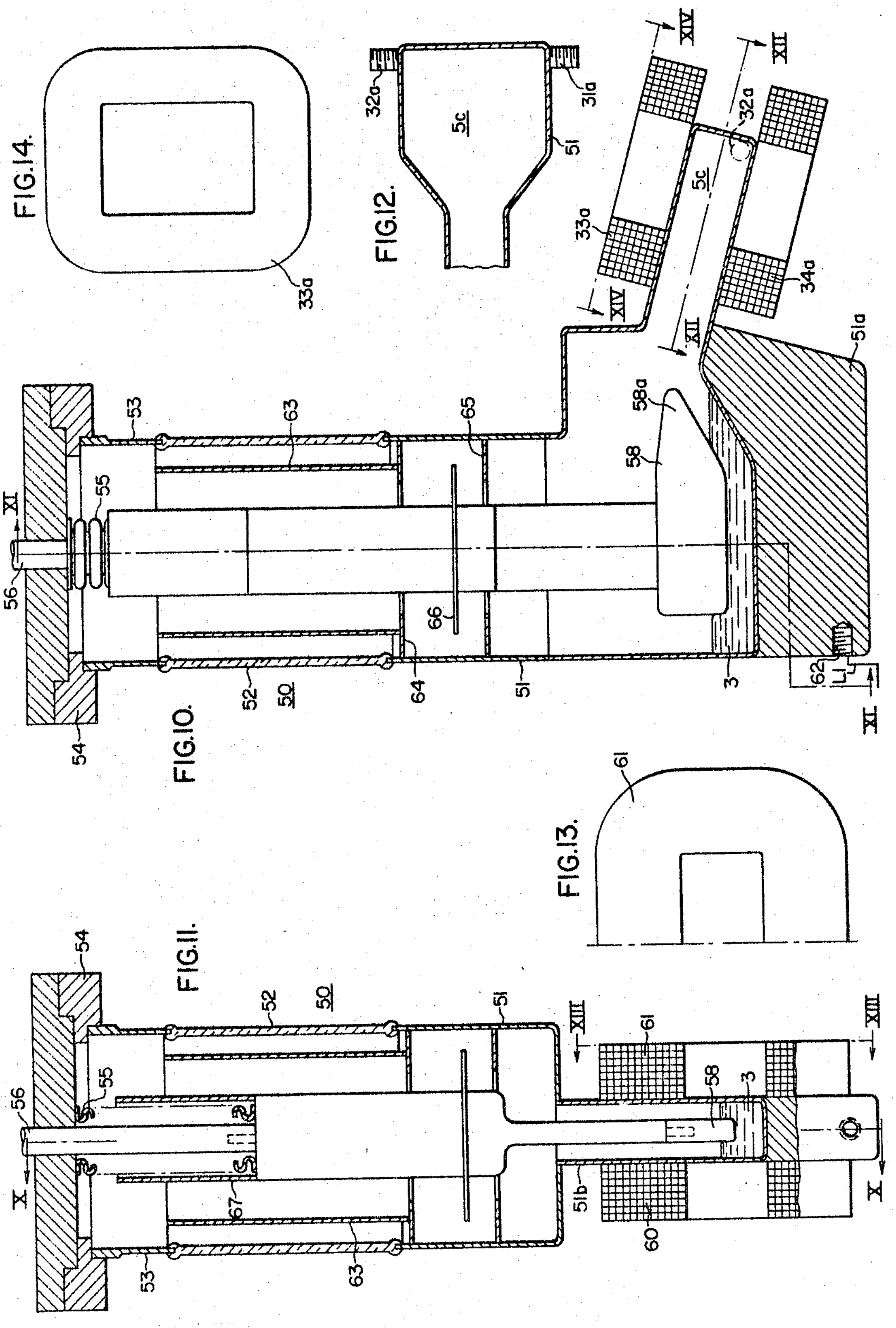
FIG. 10 is a sectional view taken along the line X—X of a modified-type of gallium-type circuit interrupter, as shown in FIG. 11, and illustrating a further constructional form, the device being shown in the conducting condition.
FIG. 11 is a sectional view taken along the line XI—XI of the gallium-type circuit interrupter of FIG. 10.
FIG. 12 is a sectional fragmentary view taken along the line XII—XII of the device of FIG. 10, and showing the electrodes used in the collecting chamber.
FIGS. 13 and 14 illustrate, respectively, views of the coil structure taken along the lines XIII—XIII and XIV—XIV of FIGS. 11 and 10, respectively.
Figure 26:
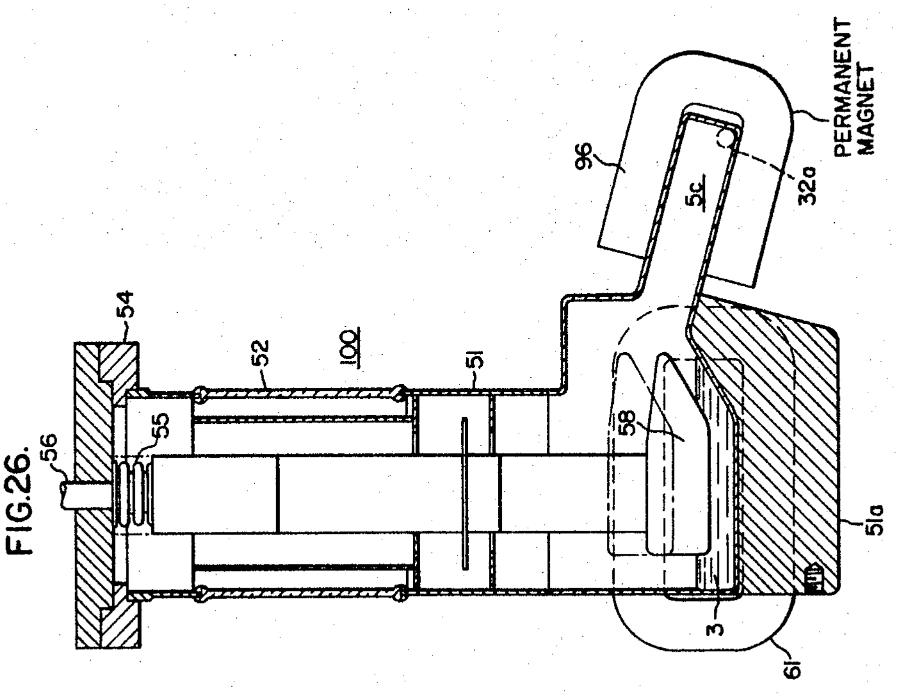
Figures 24, 25:
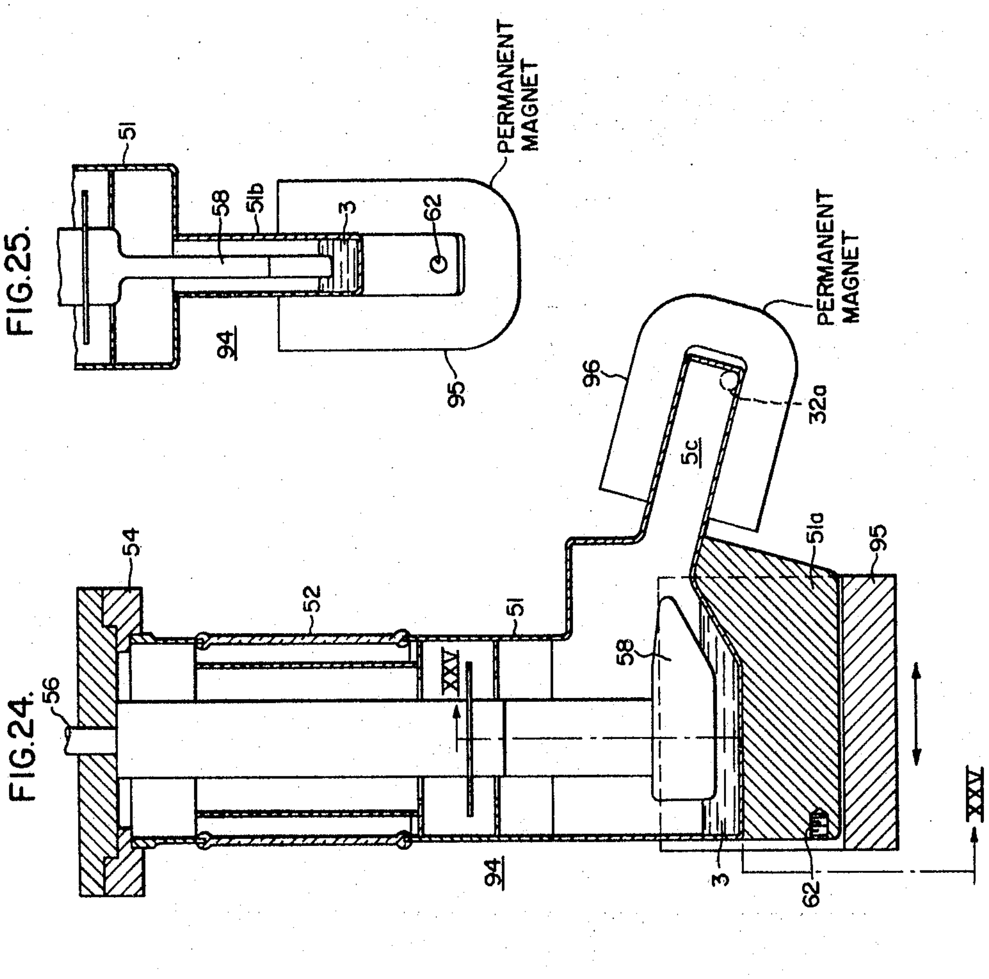
FIG. 24 is a vertical sectional view taken through a modified-type of gallium-type circuit interrupter in which a movable and a fixed permanent magnet provide the opening and closing magnetic fields, the device being illustrated in the closed-circuit position.

FIG. 25 is a sectional view taken substantially along the line XXV—XXV of the device of FIG. 24; and FIG. 26 is a vertical sectional view taken through a modified-type device, somewhat similar to that of FIG. 10, but utilizing a fixed permanent magnet for effecting closing of the circuit interrupting device, and, the combined action of the bellows contraction together with the application of the electromagnet to effect opening of the circuit.

In providing a successful vacuum-type circuit interrupter there are some major problems which must be solved: (1) The indefinite maintenance of a high static vacuum in the evacuated envelope; (2) being able to interrupt the current when its value is close to current zero, without producing high inductive overvoltages; (3) the ability to withstand a high voltage when the contacts are separated; (4) the ability to maintain low contact resistance upon closure even after many interruptions; (5) holding the erosion of and protrusion formation on the electrodes to a minimum; and finally (6) prevent sticking or welding of the contacts in a closed position so that they may be opened with a minimum of effort in a reproducible fashion. It is a particular advantage of the devices to be described hereinafter that the foregoing problems have all been successfully overcome.

Use of a liquid metal in a circuit breaker lends itself easily to three types of interrupting methods which may be used independently or together. One method is in which the vessel is rotated causing the bridging liquid to move away from between the fixed electrodes. Another method is in which a solid electrode dips into a pool of liquid metal. By traction of a reciprocating member, as for example a bellows, the electrode is lifted out of the pool thus breaking the circuit. The third method is just as basic, but a little more subtle. One can use the very current in the liquid metal to interact with an applied external magnetic field to move the liquid away from the conducting position by means of the Lorentz force $\vec{dF}=\vec{Id}1\times\vec{B}$. An additional advantage of using the Lorentz force to move the liquid away from the conducting position is that it also acts to extinguish the ensuing arc. Variations of these methods are also possible. For example, one could use the Lorentz force to hold the liquid in the conducting position against the force of gravity. By shutting off the external magnetic field, the liquid would fall out by gravity.

The Lorentz force method of interruption with a liquid metal may be used for either alternating or direct current. By varying the magnitude of the external magnetic field and hence the force, one may almost arbitrarily interrupt a given current as quickly or slowly as one desired. By varying the applied magnetic field accordingly, one may keep the maximum time rate of change of current to a minimum to avoid high inductive overvoltages. The external magnetic field may be applied in many ways. A direct or alternating current may be turned on in an electromagnet; or a permanent magnet may be brought into position. The field may be turned off after interruption is achieved, or left on to increase the breakdown voltage for certain applications. One way of supplying the magnetic field is to discharge a capacitor through the field coils. When an alternating magnetic field is used to interrupt DC, the half period of the field oscillation should be greater than the interruption time.

It is possible in principle to produce AC interruption with a constant direction magnetic field, or one which alternates out of phase with the current in the interrupter. However, this requires a very large magnetic field to produce sufficient impulse to effect interruption in one-half cycle. If interruption does not result in one-half cycle, the force is then in the wrong direction. An additional drawback of such a method is that a sensing and directing device is required to determine the direction of the current when interruption is initiated, or the force may be in the wrong direction.

By using all, or a part of the fault current itself, in the proper manner, one can avoid all of the above drawbacks. In addition, the opportunity is afforded to accelerate the liquid metal over more than one-half cycle before it leaves the fixed electrodes. Thus, it may reach a high velocity before actual interruption with the ensuing arc. This may reduce the amount of energy dissipated in the arc and the actual arcing time.

Figure 7:
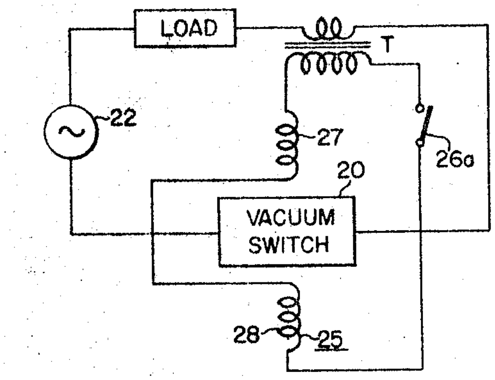
FIG. 7 is a diagrammatic view illustrating how the energy for providing the magnetic field for the device of FIG. 6 may be obtained from the series circuit itself, the circuit connections being indicated for the closed-circuit position of the device.

Since the magnetic flux density, B, produced by the electromagnet, is in phase with the current through the electromagnet, having the current in the electromagnet in phase with the fault current, I, in the interrupter will insure that B and I are in phase. Hysteresis effects can be made negligible by using an air core, or a properly made laminated core. The circuit diagram of FIG. 7 illustrates a way in which the fault current may be used to activate the electromagnet, so that the fault current and magnetic field oscillate in phase.

By varying the magnitude of the applied magnetic field, and hence the force, one may interrupt a given current almost as quickly or as slowly as one desires. Neglecting mechanisms other than the Lorentz force, the necessary flux density, B, of the external magnetic field normal to the current is approximately, $$B \sim \frac{2\pi f \rho AS}{I_o} \Big/ \left[ (\tfrac{1}{2}f - t_1) \cos 2\pi f t_1 - \frac{1}{2\pi f}(1 - \sin 2\pi f t_1) \right]$$

for a sinusoidal current and a constant magnetic field; for a linear current decrease and a constant magnetic field, $$B \sim \frac{3\rho AS}{I_o t_2^2}$$

for an in phase sinusoidal current and sinusoidal magnetic field, $$B \sim \frac{\rho AS \sin 2\pi f t}{I_o} \Big/ \left[ (\tfrac{1}{4}t_2^2 + \tfrac{1}{4}t_1^2 - \tfrac{1}{2}t_1 t_2) + \frac{1}{32\pi^2 f^2}(\cos 4\pi f t_2 - \cos 4\pi f t_1) + \frac{\sin 4\pi f t_1}{8\pi f}(t_2 - t_1) \right]$$

where:

$t_1$ is the time at which interruption is initiated, in seconds;

$t_2$ is the time at which interruption is complete, in seconds;

$I_o$ is the maximum current in amperes through the interrupter;

$f$ is the frequency of the current, or magnetic field;

S is the distance the liquid metal must be moved to achieved interruption, in meters;

$\rho$ is the mass density of the liquid metal, in kilograms per cubic meter;

A is the cross-sectional area of the liquid metal in the conducting position, in square meters.

Inherent in the interruption characteristics of a liquid metal switch is the separation force due to the pinch effect. Whenever current goes through a conductor, there is an inward radial magnetic pressure on the conductor given by:

$$\frac{\mu I^2}{4\pi^2 a^4}(a^2 - r^2)$$

where:

$\mu$ is the permeability of the conductor;

I is the current through the conductor;

$r$ is the radial distance from the axis of the conductor;

$a$ is the radius of the conducting surface.

As the liquid metal is being forced away from the conducting position, by whatever means, unduloids will form on its surface. Variations in the radial pinch effect pressure due to the unduloids cause longitudinal forces to act from the smaller to the larger cross sections. The longitudinal forces are proportional to:

$I^2 \ln(a_1/a_2)$ where $a_1$ is the larger, and $a_2$ is the smaller radius. This serves to pull the liquid metal apart and to be part of the interruption process regardless of the means by which interruption was initiated.

Depending on the speed with which interruption is desired, other means than by applying an external magnetic field may be used. Other embodiments of this invention can vary from using gravity to move the liquid by rotation of the cylinder; or moving it by sending a shock wave through it; or supporting it in the closed position by means of an electromagnetic field, which is turned off to let the liquid metal drain away by gravity; or moving it away by means of a solenoid action where the liquid metal moves into or out of the solenoid; or by any other means. An additional possible mode of operation is in which the liquid metal wets the insulating envelope. When the liquid metal is moved away from the conducting position, a thin metal film remains which quickly vaporizes until the current goes to zero.

Closure of the switch can be achieved by any of the above-mentioned mechanisms operating in the reverse direction. The liquid metal will make good electrical contact upon each closure, since there will be no erosion or protrusion formation as with solid interrupter contacts. In the latter, the contact resistance increases with use due to erosion and formation of protrusions. Erosion, pitting and protrusion formation also decrease the breakdown voltage of solid interrupter contacts.

An additional advantage of this switch is its noiseless operation. It also has great potential for use as a synchronous AC interrupter.

To be able to withstand a high voltage, when the switch is in the open position, it is necessary to have a large enough separation between the electrodes, and to maintain a pressure less than $10^{-4}$ torr. The vacuum breakdown voltage in the open position follows a law of the form $Kd^{5/8}$ where $d$ is the electrode separation, and K is a function of the electrode material and geometry. This is set forth in more detail in a paper by M. Rabinowitz in Vacuum, 15 (1965), 59.

Glass can be a disturbing influence in a high-voltage circuit breaker if proper precautions are not taken. Donaldson and Rabinowitz as reported in J. Appl. Phys., 34

(1963), 319 found that glass particulate contamination has a strong influence in reducing breakdown voltage in vacuum. They found that "clean" glass systems are not clean because glass itself, when heated, decomposes and releases water vapor, as well as other normal constituents of glass into the vacuum environment.

Particles of contamination reside on surfaces inside vacuum systems as a result of thermal decomposition of glass. These particles contain at least Na, K, and B, as well as traces of Al and Si. The particles range in size from $10^{-6}$ to more than $10^{-5}$ cm. in diameter, and contain approximately $10^5$ to $10^9$ atoms.

When one considers that a single particle containing $10^9$ atoms could yield a current of 0.1 ma. for a microsecond if all the atoms were singly ionized, it becomes clear that the effects of only a small amount of contaminant could be significant if critically located. In addition, these particles provide large surface areas for the adsorption of gas atoms which would lead to a pressure rise in an evacuated vessel when these particles are heated or vaporized during arcing.

These particle deposits once produced are not removed by vacuum bakeout at 450° C., nor when the glass is annealed in air at 560° C. It is probable that these particles have influenced many experiments in an unknown way, and in some cases may have been the controlling factor. It has been found that these particles can be removed readily by suitable washing, for example by washing with distilled water, and then CP acetone.

We prefer to use gallium or low-vapor-pressure alloys thereof in our invention. Gallium shows some particularly unique properties among metals. Of all the elements, it has the widest temperature range for the liquid phase at atmospheric pressure. The melting point is at 29.75° C.; that means that a piece of the metal melts when held in the hands. But the boiling point at 760 mm. of Hg pressure of about 2000° C. is remarkably high. The vapor pressure remains rather low even at comparatively high temperatures; this property is critical in this invention. The chemical properties of gallium are comparable to those of aluminum, the physical properties, however, are more closely comparable to those of zinc.

Although gallium is a widely distributed element and exists in roughly the same quantity as lead, it is one of the rarer elements because of its low concentration in the ores. Germanite from the Tsumeb mine in South West Africa was for a long time the richest mineral with approximately 0.8% gallium. Recently, the discovery of gallite, $CuGaS_2$, the very first gallium mineral, was reported from the same place; its amount, though, seems to be rather small. Gallium dissolves only with difficulty in most mineral acids, but fairly easily in aqua regia or perchloric acid.

| | | |
|---|---|---|
| Atomic weight | | 69.72 |
| Atomic number | | 31 |
| Melting point (lowest of metals, Hg and Cs excepted) | ° C. | 29.75 |
| Boiling point | ° C. | >2000 |
| Latent heat of fusion | cal./g. | 19.16 |
| Latent heat of vaporization | cal./g. | 1014 |

| Specific Heat, at— | Cal./g. ° C. |
|---|---|
| —258.1° C. (solid) | 0.0049 |
| —213.1° C. (solid) | 0.044 |
| 0 to 24° C. (solid) | 0.09 |
| 21 to 100° C. (liquid) | 0.098 |

| Density, at— | G./cm.³ |
|---|---|
| 29.6° C. (solid) | 5.904 |
| 29.8° C. (liquid) | 6.095 |
| 301° C. (liquid) | 5.905 |
| 1100° C. (liquid) | 5.445 |

| | | |
|---|---|---|
| Increase of volume on solidification | percent | 3.2 |
| Hardness (Mohs scale) | | 1.5 to 2.5 |

Vapor pressure at given temperature:

| Temp. ° C.: | Vapor pressure (torr) |
|---|---|
| 480 | $1\times10^{-11}$ |
| 520 | $1\times10^{-10}$ |
| 560 | $1\times10^{-9}$ |
| 620 | $1\times10^{-8}$ |
| 670 | $1\times10^{-7}$ |
| 740 | $1\times10^{-6}$ |
| 820 | $1\times10^{-5}$ |
| 900 | $1\times10^{-4}$ |
| 1000 | $1\times10^{-3}$ |

| Coefficient of cubic thermal expansion, at— | |
|---|---|
| 0 to 30° C. (solid) | $5.4\times10^{-5}$ |
| 100° C. (liquid) | $12.0\times10^{-5}$ |
| 900° C. | $9.7\times10^{-5}$ |

| Viscosity, at— | Poises |
|---|---|
| 97.7° C. | 0.01612 |
| 1100° C. | 0.00578 |

| Surface tension, against— | Dynes/cm. |
|---|---|
| $H_2O$ | 592 |
| $CO_2$ | 735 |

| Resistivity, at— | μΩcm. |
|---|---|
| 0° C. (solid) | 53.0 |
| 28.6° C. (solid) | 44.8 |
| 29.7° C. (liquid) | 28.0 |
| 46.1° C. (liquid) | 28.4 |

Superconductivity, at 1.05° K.

| Diamagnetic with magnetic susceptibility, at— | (Cgs. units) |
|---|---|
| 18° C. (solid) | $-0.24\times10^{-6}$ |
| 100° C. (liquid) | $-0.04\times10^{-6}$ |

Alloys of gallium, which in some cases may be solutions of the respective components in each other, comprise one or more metals which exhibit a low vapor pressure of less than $10^{-4}$ torr at temperatures of up to about 100° C. The alloys preferably should have a vapor pressure of less than $10^{-6}$ at 25° C., and will be as low as $10^{-13}$ torr at 25° C. in many cases. The alloys are liquid at room temperature or liquify below about 200° C.

By choosing a gallium liquid such as a gallium-indium-tin alloy the pressure in the switch can be kept quite low, since its vapor pressure is only $10^{-8}$ torr at 600° C. The composition 62.5% gallium, 21.5% indium, and 16.0% tin has a melting point of about 10° C. and a boiling point of about 2000° C. The feature of maintaining a high vacuum in the switch can be achieved since the liquid metal, as well as the entire switch can be outgassed by high-temperature heating during evacuation.

Other liquid metals can also be used depending upon the particular application of the interrupter. Gallium (melting point about 30° C.) or other metals which are solid at S.T.P., could be used by simply operating the switch in an oven or heated chamber or by the addition of heating coils around the switch.

The present invention has particular applicability as applied to a liquid metal containing gallium as an essential component, and the balance, if any, being a metal soluble in gallium to form a liquid, and the liquid metal being characterized by a low vapor pressure at room temperature, and temperatures near thereto, for example from 0° C. to 100° C., and also being liquid at operating temperatures or readily liquefiable by moderate heating.

"Low vapor pressure" as used herein preferably does not exceed $10^{-6}$ torr at room temperature, but in no event exceeds $10^{-4}$ torr, and for practical use is made lower than $10^{-6}$ torr—being as low as $10^{-13}$ torr.

In addition to the use of gallium alone, alloys of gallium, preferably those having a major proportion of gallium and a minor proportion of one or more soluble elements, also characterized by low vapor pressure at room temperatures, may be used. These added elements are particularly useful since they depress the freezing point for gallium alone (29.7° C.); and, consequently, the alloys are liquid at temperatures substantially below room temperature depending upon the amount and nature of the additive. The alloys exhibit differences over gallium alone in other properties such as electrical and thermal conductivity to suit particular requirements.

Suitable metals to add to gallium in practicing the invention are indium (In), tin (Sn), copper (Cu), silver (Ag), gold (Au), palladium (Pd), iron (Fe), aluminum (Al), germanium (Ge), zinc (Zn), calcium (Ca), cadmium (Cd), nickel (Ni), and platinum (Pt). These may be employed individually, or two or more may be added to gallium. Also a small amount of mercury (Hg), bismuth (Bi), or tellurium (Te) may be added to gallium and gallium alloys for particular applications.

While alloys with over 50% weight of gallium are preferred, alloys of gallium with less than 50% gallium, and as low as 20% gallium, may be employed provided that they are liquid at temperatures of 100° C. or lower, and they have the required vapor pressure.

Binary alloys of gallium, ternary alloys, quaternary and higher alloys may be utilized to advantage. Examples of binary alloys of gallium are (90% gallium—10% silver), (90% gallium—10% gold), (90% gallium—10% aluminum), (90% gallium—10% copper), and (80% gallium—20% tin).

Examples of ternaries are (96% gallium—3% platinum—1% palladium) and (95% gallium—1% gold—4% silver). An example of a quaternary alloy is (85% gallium—5% copper—5% tin—5% gold). In each of these alloys, small quantities of, for example, 0.1% of mercury, bismuth or tellurium may be added.

Figure 1:
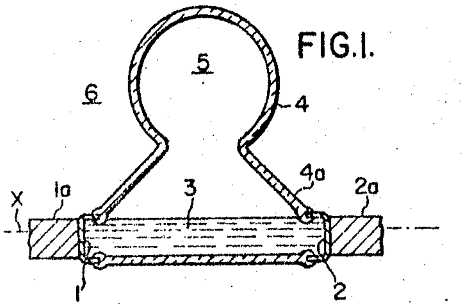
FIGURE 1 is a vertical sectional view taken through a gallium-type circuit interrupter, the device being shown in the closed-circuit position.

With reference to FIG. 1 of the drawings, it will be noticed that there is provided a pair of spaced electrodes, or contacts, 1, 2, which are electrically bridged by a conducting liquid metal. We prefer to utilize gallium, or alloys thereof. Liquid gallium, or an alloy, such as a gallium-indium-tin mixture (62.5% gallium, 21.5% indium, and 16.0% tin with a melting point of 10° C.) may serve this purpose very well. The reference numeral 3 indicates the liquid gallium, or low-vapor-pressure alloys thereof, which is enclosed within an evacuated chamber 4 having a collecting region 5. FIG. 1 illustrates the position of the several parts in the closed-circuit position of the gallium-type circuit interrupter 6. To effect an opening operation of the device 6, it is merely necessary to rotate the axially-aligned electrodes 1, 2 about their axis X to position the device 6 as indicated in FIG. 2 of the drawings.

Figure 2:
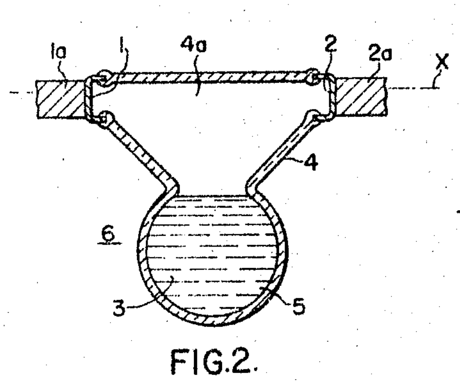
FIG. 2 is a view similar to that of FIG. 1, but illustrating the position of the several parts in the open-circuit position of the device.

With reference to FIG. 2, it will be noted that the liquid metal gallium 3 has drained to the collecting chamber 5, the enclosure 4 being rotated to a position approximately 180° about the axis X of the device from its initial position, as shown in FIG. 1. The supporting electrodes 1, 2, which may be of copper, for example, are operatively mounted so that the evacuated chamber 4 may be rotated about the axis X of the rod-shaped terminals 1*a*, 2*a*. It is thus apparent that to open the switch 6, and thus break the circuit, the chamber 4 is merely rotated so that the evacuated bulb 5 moves from a position above the liquid metal gallium 3 to a position below the liquid metal. The metal 3 thus drains out of the upper portion 4*a* (FIG. 2) into the lower evacuated collecting bulb 5, and such action breaks the connected circuit. This method of opening the circuit finds application where the speed of interruption is not critical.

The maintenance of a high static vacuum within the enclosure 4 may be achieved, since the liquid metal gallium 3, or its alloys, as well as the entire chamber 4 can be outgassed by high-temperature heating during evacuation. Once the chamber is sealed off, no impurities can enter into the liquid metal.

After the liquid metal gallium has left the conducting region, the electrodes 1, 2 are separated by a vacuum. It is only necessary to have them sufficiently far apart to withstand the high voltage in question.

Figure 4:
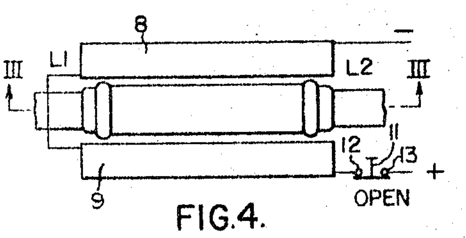
FIG. 4 is a top plan view of the device of FIG. 3 taken along the line IV—IV of FIG. 3 illustrating the coil connections for the gallium-type circuit interrupter of FIG. 3, the circuit being closed, thereby maintaining the device in the closed-circuit position.

Other means for removing the liquid metal 3 from the intro-electrode region may be used for applications in which the switch must be opened more rapidly than easily attained by the foregoing structure. For example, with reference to FIGS. 3 and 4 of the drawings, it will be observed that a magnetic field is supplied by electromagnets 8, 9, which exert an upward Lorentz force upon the liquid metal 3, as indicated by the reference numeral 10, maintaining the conducting state between the spaced electrodes 1, 2. With reference to FIG. 4 of the drawings, it will be apparent that pressing the "open" button 11 will break contact at the contacts 12, 13, thereby turning off the magnetic field and permitting the liquid metal 3 to fall by gravity into the collecting region 5, which is disposed below the conducting position 15 of the liquid metal gallium 3.

To close the device 18, the chamber can be physically rotated, as in the arrangement illustrated in FIGS. 1 and 2, to allow the metal 3 to drain back into the intra-electrode region. The supporting electromagnetic field is then turned on, and the chamber rotated so that the evacuated part 5 is again beneath the liquid metal 3.

Figure 5:
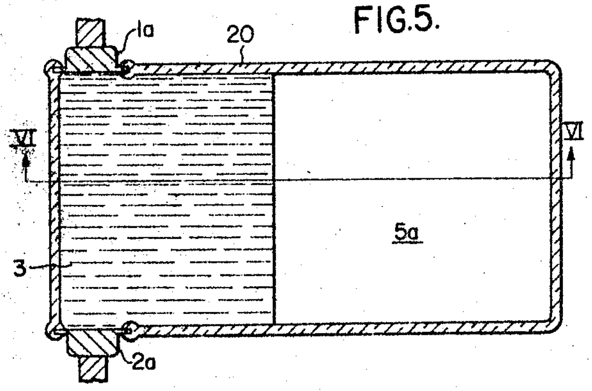
FIG. 5 is a sectional view of a modified-type of gallium-type circuit interrupter taken along the line V—V of FIG. 6, in which a magnetic field effects opening of the device, and rotative means may be employed to effect reclosure of the device.
Figure 6:
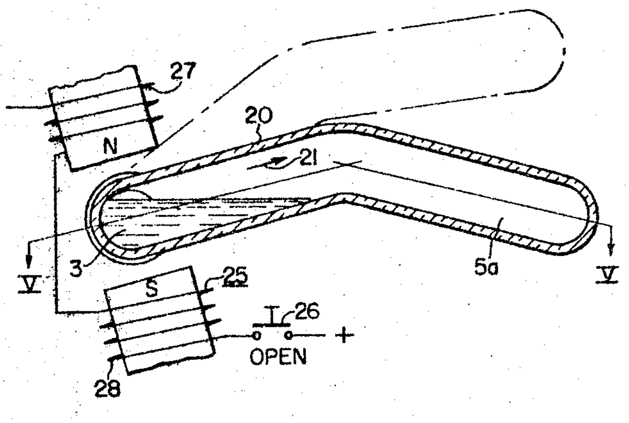
FIG. 6 is a vertical sectional view taken through the modified-type device of FIG. 5 along the line VI—VI thereof, the conducting state being illustrated.

With reference to FIGS. 5 and 6 of the drawings, it will be observed that there is shown the liquid metal 3 in a highly-evacuated insulating envelope 20, with a pair of metallic end cap electrodes 1*a*, 2*a*, which may assume various shapes. The end caps, or electrodes 1*a*, 2*a* are sealed to the envelope 20, forming a vacuum-tight connection. The whole assembly is of an imperforate vacuum-tight construction. The liquid metal 3 is shown in the closed (conducting) position. By means of a suitably applied force in the direction shown by the arrow 21, the liquid metal 3 moves from the conducting position into the evacuated collecting region 5*a*, thereby interrupting the current.

FIGS. 5 and 6 illustrate the use of an electromagnet 25, which supplies an external magnetic field normal to the current to move the liquid metal 3 from the conducting position to the open (non-conducting) position in the evacuated collecting region 5*a*. The electromagnet 25 is activated when current interruption is desired. This may be obtained by closing an "open" button 26 to energize the electromagnet 25 from a suitable source of electrical energy. Although the device of our invention is suitable to both alternating current and direct current, the device of FIGS. 5 and 6 is illustrated as being used with direct current.

In addition to moving the liquid metal 3 away from the conducting position, the force due to the magnetic field extinguishes the ensuing arc by also moving it away from the conducting position. The force is the Lorentz force $\vec{F}=i\vec{l}\times\vec{B}$, and persists as long as there is both an external magnetic flux density, B, and a current, *i*, flowing through the interrupter.

We have tested a small device of the type set forth in FIGS. 5 and 6 using only about 100 grams of gallium and obtained excellent interrupting results. For example, we have typically interrupted 1400 amperes at 160 volts DC, and 800 amperes at 160 volts AC with negligible amount of arcing. We have interrupted an accumulated total of 50,000 amperes during repeated testing of this device with no sign of erosion of the fixed electrodes. These values of current and voltage by no means represent the limits of interrupting ability of this device. In addition, contact resistance has been reduced by more than a factor of 100 compared to solid electrodes making high pressure contact. Small models of the types set forth in the other figures have also been successfully tested.

Using a small test chamber of the type illustrated in FIG. 10, hereinafter described, we have easily interrupted 8,800 amperes at 1,200 volts AC. Even at low currents and low voltages, there was no evidence of appreciable current chopping, the level being consistently less than 1 ampere. After numerous repeated tests, there was no sign of erosion of the fixed electrodes with an accumulated total of 500,000 amperes of interruption.

FIG. 7 diagrammatically illustrates how a portion of the line current may be utilized to energize the magnetic field 25 to effect opening of the switch. It will be noted that closing the "open" switch 26*a* will cause the magnetic coils to receive energy from the transformer T energized from the same source 22, which supplies the line current.

Figure 8:
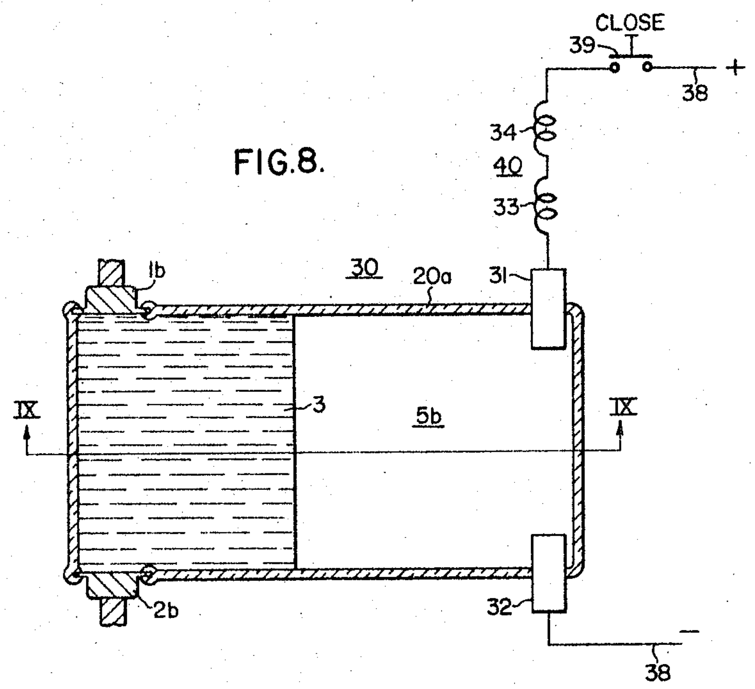
FIG. 8 is a sectional plan view taken through a modified-type of gallium-type vacuum circuit interrupter along the line VIII—VIII of FIG. 9, utilizing electrode and coil means for effecting a reclosure of the circuit through the device. In many respects, this device is similar to that of the device of FIGS. 5 and 6.
Figure 9:
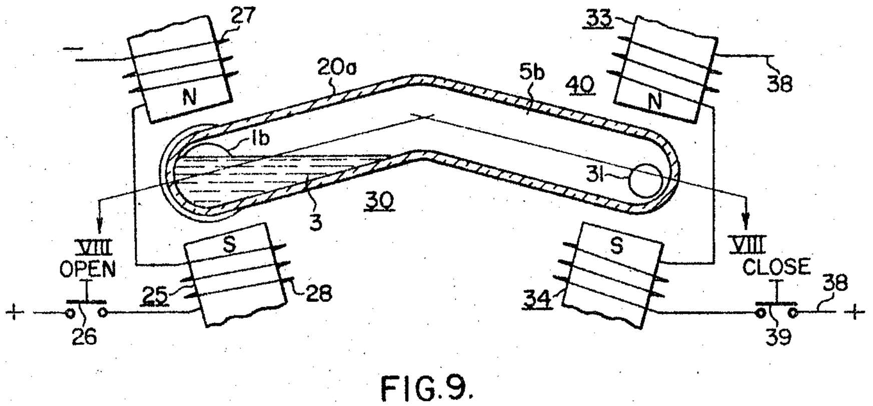
FIG. 9 is a vertical sectional view taken through the gallium-type circuit interrupter of FIG. 8 along the line IX—IX thereof, the device being shown in the closed-circuit position.

FIGS. 8 and 9 illustrate a modified-type of device, genally designated by the reference numeral 30, comprising spaced electrodes 1*b*, 2*b*, electrically bridged by the conducting liquid metal 3, and utilizing an electromagnetic field 25 in the same manner as set forth in FIGS. 5 and 6 of the drawings. However, to effect closing of the device 30, it will be noted that there is provided a pair of spaced electrodes 31, 32, which are in series with a pair of electromagnets 33, 34, as indicated in FIGS. 8 and 9 of the drawings. The electrode 32 is connected to a suitable energy source 38, and the series magnetic field coil 34 is connected serially through a "close" push button 39 to the positive side of the energy source 38. Thus, by closing the "close" button 39, the series coils 34, 33 will become energized, and thereby effect a closing force upon the liquid gallium 3, which is collected in the receiving chamber 5*b* in the open-circuit position of the switch 30. As a result, there is provided a magnetic field 25 for effecting opening of the device 30, and an additional field 40 to effect closing of the device 30. This has the important advantage of providing a device, which is electrically controlled in both the opening and closing conditions and, as a result, rotation of the device, or a physical movement of the receptacle 20*a*, is not required. As shown, the coils for opening and closing are connected in series in their respective circuits. The coils may also be connected in parallel with each other in their respective circuits.

FIGS. 10 and 11 illustrate a modified-type of device, generally designated by the reference numeral 50, and comprising a metallic container 51 having an insulating extension 52. The upper end of the insulating extension 52, as shown, is hermetically connected to a supporting sleeve 53, which, in turn, is attached to an upper support plate 54. Extending downwardly, by means of a bellows 55, is a movable operating rod 56, to the lower end of which is attached a movable electrode 58. As shown more clearly in FIG. 10, the electrode 58 has an elongated portion 58*a*, which tends to make continuous contact with the liquid metal gallium 3 during a considerable portion of the time of outward thrust upon the gallium 3, as effected by the side electromagnet coils 60, 61. These coils 60, 61 may be electrically connected to a suitable control circuit, as shown in FIG. 7. As a result, closing of an "open" button 26*a* will energize the coils 60, 61 and cause a physical expulsion of the liquid gallium 3 to the right, as viewed in FIG. 10, into the receptacle 5*c*. As was true with the device 30 of FIGS. 8 and 9, there are provided a pair of closing electrodes 31*a*, 32*a*, which are interconnected by the gallium in the receptacle 5*c* and serially connected with the closing coils 33*a*, 34*a*, will effect expulsion of the gallium 3 back into its original position as shown in FIG. 10, whereby it is in conductive relation between the movable electrode 58 and the metallic container 51. The electrodes 31*a*, 32*a*, are shorted out by the metal walls of the receptacle 5*c* as shown in FIG. 12. Current sent through the electrodes 31*a*, 32*a* will divide between the liquid metal 3 and the receptacle walls 51*b* inversely in proportion to their respective resistances. The current through the liquid metal 3 in interacting with the external magnetic field set up by coils 33*a*, 34*a*, will cause it to move back into the closed position as shown in FIG. 10. The electrodes 31*a*, 32*a* and the closing coils 33*a*, 34*a* may be separately powered. A permanent magnet may be used in place of the closing coils 33*a*, 34*a*. A line terminal stud 62 is connected to the base portion 51*a* of the metallic container 51 for a connection of the line conductor $L_1$.

It will be noted that the metallic container 51 has a relatively narrow portion 51*b*, which enables the electromagnet coils 60, 61 to be in close proximity to the movable electrode 58 and the base container 51*a*, so as to exert a strong magnetic field upon the gallium 3.

Also shown in FIG. 10 is the cylindrical shield 63, cooperating with the two annular shields 64 and 65, together with the umbrella shield 66 to prevent splashing and vapor from reaching the insulator wall 52 and the bellows 55, to prevent their becoming coated by a conducting layer of the liquid metal and/or their becoming exposed to thermal shock. A bellows shield 67 is also provided to additionally protect the bellows 55.

From the foregoing description, it will be apparent that pressing the "open" button 26 (FIG. 6) will cause a magnetic field to be set up by the coils 60, 61 which will effect opening of the switch 50. A closing of the "close" button 39 (FIG. 9) will conversely effect a physical expulsion of the gallium 3 out of the cavity 5*c* and back into its original position to close the circuit, as illustrated in FIG. 10. An additional mode of operation is in which the movable electrode 58 is lifted out of the liquid metal 3, by means of the bellows 55 at the same time that the magnetic field is applied to cause interruption.

Figure 15:
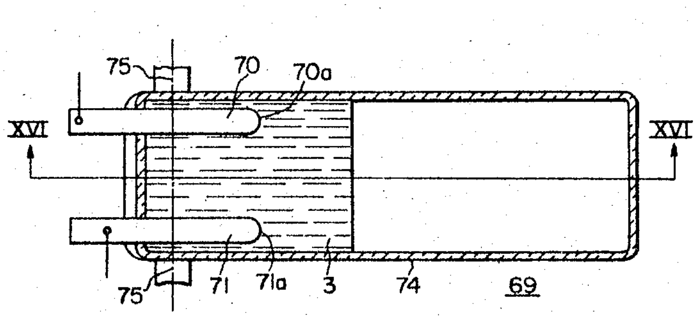
FIG. 15 is a sectional plan view of a modified-type of gallium switch, the device being illustrated in the closed-circuit position, and the view being taken along the line XV—XV of FIG. 16.
Figure 16:
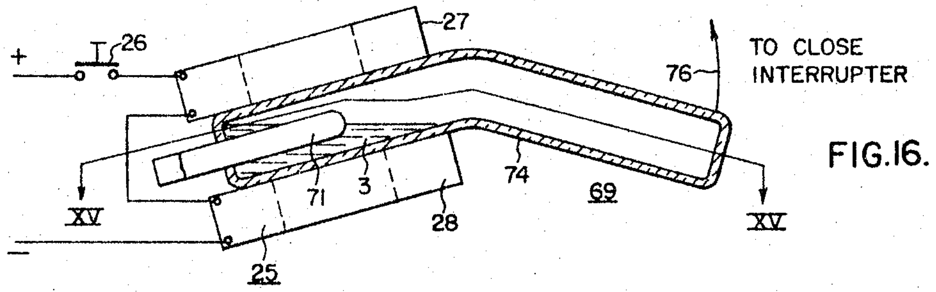
FIG. 16 is a side sectional view of the gallium switch of FIG. 15 taken along the line XVI—XVI thereof.

FIGS. 15 and 16 illustrate a modified-type of device 69 in which a pair of spaced electrodes 70, 71 have a considerable longitudinal extensional length in the opening direction of the expulsion of the gallium 3, so that there will be continuous electrical contact during a portion of the physical expulsive movement of the gallium in the opening operation. In other words, by the time that the gallium 3 has left the tip extremities 70*a*, 71*a* of the spaced electrodes 70, 71, during the opening operation, the gallium 3 will have attained considerable velocity by this time. The result is rapid arc interruption. The Lorentz force, brought into action by the electromagnets 25, is used to move the liquid 3 to open the circuit.

With the device set forth in FIGS. 15 and 16, a physical rotation of the envelope 74 about a pivot axis 75, as indicated by the arrow 76, is required to effect a displacement of the gallium 3 back into the closed bridging position, as shown in FIG. 15.

Figure 18:
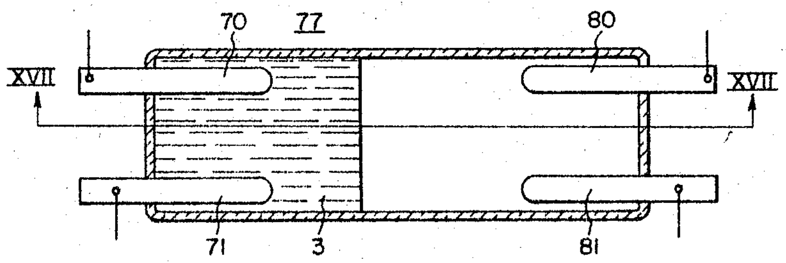
FIG. 18 is a plan view in section taken along the modified-type of gallium-type circuit interrupter, shown in FIG. 17, the view being taken substantially along the line XVIII—XVIII of FIG. 17.
Figure 17:
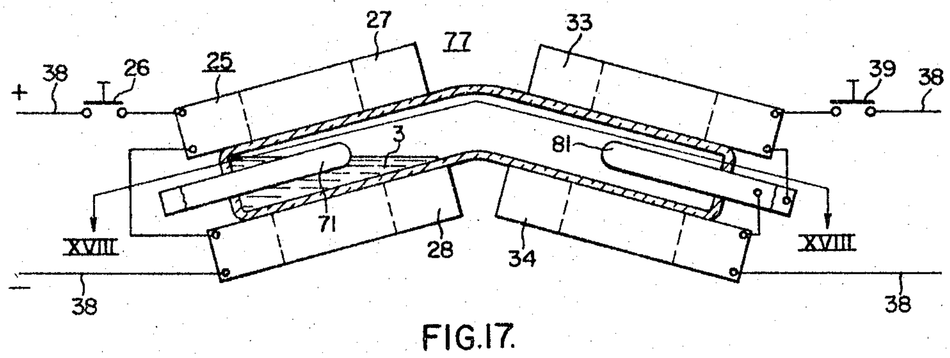
FIG. 17 is a longitudinal sectional view taken through a modified-type of gallium-type circuit interrupter illustrated in FIG. 18, having magnetic means for effecting both opening and closing of the device, the view being taken along the line XVII—XVII of FIG. 18.

FIGS. 17 and 18 illustrate a modified-type of device 77 which incorporates the advantages of a relatively long axial length of the line terminal studs 70, 71, in the opening throw direction of the gallium, the advantages of which have been pointed out above in connection with FIGS. 15 and 16 and, in addition, has spaced closing electrodes 80, 81, which also are of a considerable axial length to effect a rapid and continuous action of the closing Lorentz force upon the gallium 3 during the closing operation. The method of energizing the opening field coils 27, 28 and the closing field coils 33, 34 is as set forth above with reference to FIGS. 8 and 9; consequently, a further explanation thereof is considered unnecessary.

Figure 19:
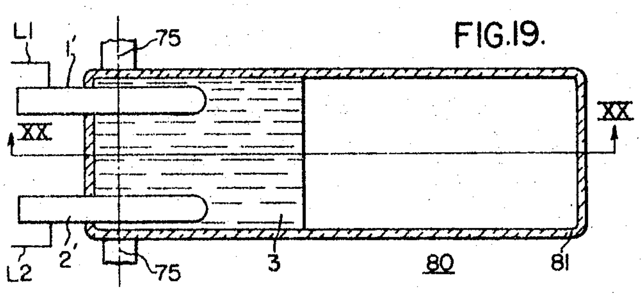
FIG. 19 is a horizontal sectional view taken through a modified-type of gallium-type circuit interrupter, similar to that illustrated in FIG. 1, but utilizing a different stationary electrode construction.
Figures 20, 23:
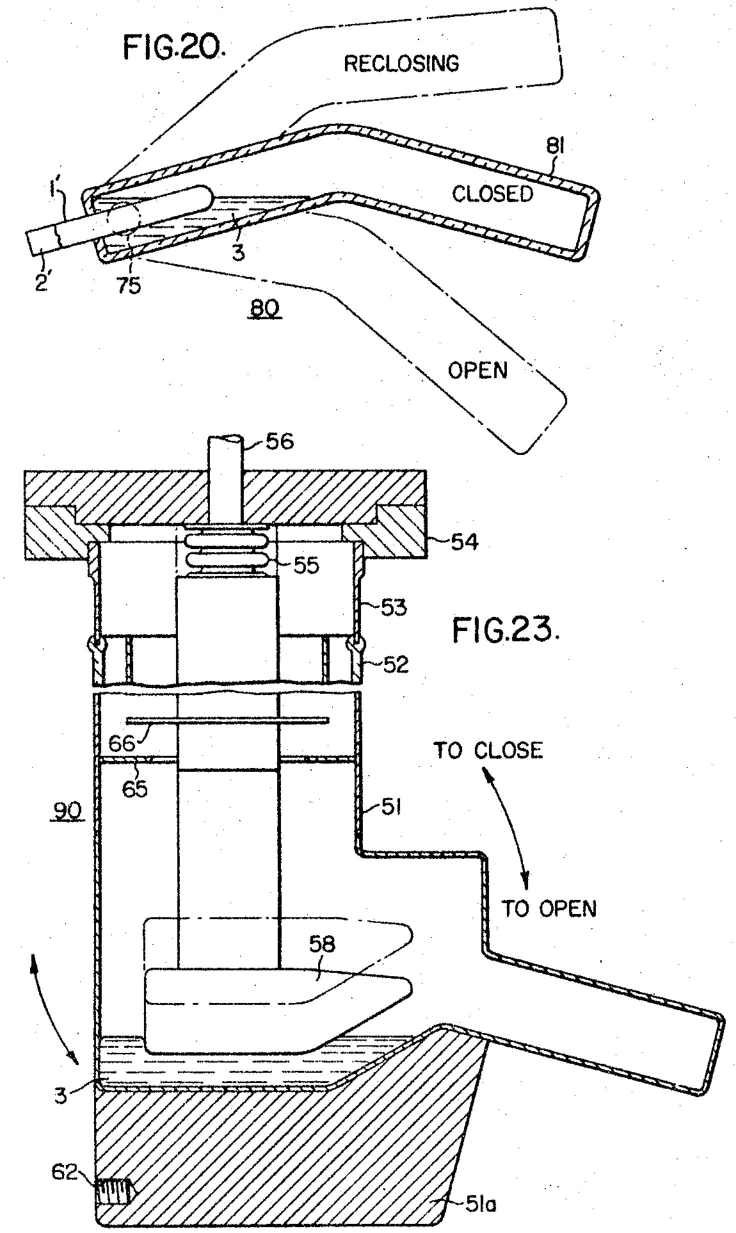
FIG. 20 is a vertical sectional view taken through the modified-type of device of FIG. 19 along the line XX—XX thereof, illustrating the position of the several component parts in the fully closed-circuit position of the device of FIG. 19 with dot-dash lines showing the open and reclosing positions.
FIG. 23 is a modified-type of gallium-type circuit interrupter in which either a tilting operation, or rotation of the device effects both opening and closing operations, and/or in which an isolating break is achieved by contraction of the associated bellows, the device being shown in the closed-circuit position.

FIGS. 19 and 20 illustrate a modified type of device 80 operating in a manner similar to that of the device 6, illustrated in FIGS. 1 and 2. FIG. 19 shows the device 80 in the closed-circuit position. To effect an opening operation of the device 80, it is merely necessary to rotate the evacuated chamber 81 about the axis 75 to position it as indicated in FIG. 20. The advantage gained here is that the liquid metal 3 remains in contact with the long electrodes 1', 2' while falling, to thereby produce a delayed, but fast break during the opening operation of the device 80.

Figure 3:
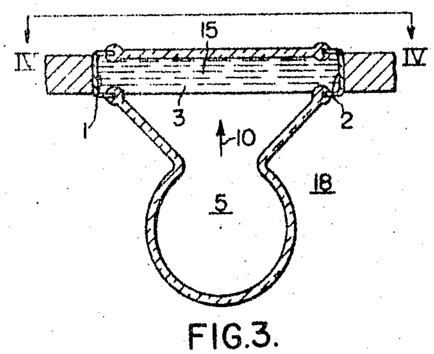
FIG. 3 is a vertical sectional view of a modified-type of gallium-type circuit interrupter taken along the line III—III of FIG. 4, in which a magnetic field retains the liquid metal gallium in an elevated position by means of the Lorentz force creating a conducting path between the spaced electrodes, the device being shown in the closed-circuit position.
Figure 21:
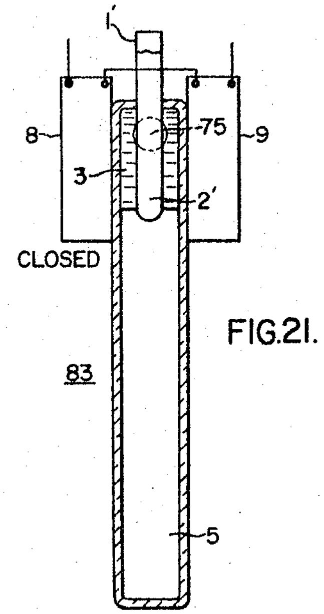
FIG. 21 is a modified-type of gallium-type circuit interrupter in the closed position, somewhat similar to that of FIG. 3, but illustrating a high-speed break electrode arrangement.
Figure 22:
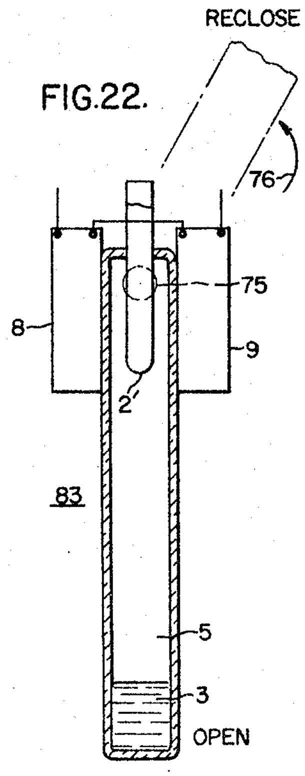
FIG. 22 is a sectional view of the device of FIG. 21, showing it in the open position.

FIGS. 21 and 22 illustrate a modified type of device 83 similar to that described in connection with FIGS. 3 and 4. The mode of operation is that explained for FIGS. 3 and 4; consequently, a further explanation thereof is deemed unnecessary. Again, the advantage is that of a delayed, but fast break by use of the long electrodes 1', 2'. Rotation of the device 83, as indicated by the arrow 76, and energization of the magnetic field is necessary to reclose the circuit.

FIG. 23 illustrates a modified-type of device 90, similar to that of FIG. 10, in which either an isolating break is achieved by contraction of the associated bellows 55, and/or a physical tilting operation of the device 90 effects both opening and closing operations.

FIGS. 24 and 25 illustrate a modified type of interrupter 94, similar to that illustrated in FIG. 10, but in which the two sets of electromagnets 33*a*, 34*a*, 60 and 61 are replaced by permanent magnets 95, 96. The magnet 95, which produces interruption, either slides, or is rotated into place at the instant when interruption is desired. The magnet 96, which effects reclosure, remains fixed in place. The manner of closing the device is the same as described in connection with FIG. 10.

FIG. 26 illustrates a modified device 100, similar to the device 50 of FIG. 10. In this case, interruption is initiated by the simultaneous contraction of the bellows 55 and the application of a magnetic field by means of the electromagnet 60, 61. Reclosure results from the interaction of the magnetic field from the permanent magnet 96, and the current which is applied through the liquid metal 3 in the reservoir 5*c*.

From the foregoing description, it will be apparent that there are provided improved vacuum-type circuit interrupters utilizing a liquid metal gallium, or gallium alloys as an electrical conductor, which has the advantage of a very low vapor pressure. Magnetic means has been utilized to effect a physical expulsion of the liquid metal out of the interelectrode space; and additional magnetic means has been proposed for a retransfer of the liquid gallium from the receptacle, provided for the open position of the device, back into the closed position. Highly advantageous experimental interrupting results were obtained by the utilization of the principles set forth above.

Although there have been illustrated and described specific structures, it is to be clearly understood that the same were merely for the purpose of illustration, and that changes and modifications may readily be made therein by those skilled in the art, without departing from the spirit and scope of the invention.

We claim as our invention:

1. An interrupting device of the liquid-metal type including, in combination:

(a) means defining a generally boot-shaped casing having a lower conducting narrowed base portion;

(b) a line connector (62) secured to the lower conducting base portion;

(c) said casing including a laterally-extending collecting portion communicating with the interior of said narrowed conducting base portion;

(d) means defining an upper cap portion through which a movable electrode sealingly extends;

(e) insulating casing means (52) interconnecting the upper cap portion with the lower conducting base portion;

(f) a second line connector electrically connected to the movable electrode;

(g) a conducting liquid electrically interconnecting the movable electrode with the lower conducting narrowed base portion in the closed position of the interrupting device;

(h) magnetic means (60, 61) straddling the narrowed base portion for expelling the liquid metal laterally into the laterally extending collecting portion during the opening operation of the device; and, (i) means for raising the movable electrode as an alternate way of operating the interrupting device.

2. The combination of claim 1, wherein the liquid metal comprises low-vapor-pressure gallium.

3. The combination of claim 1, wherein the magnetic means comprises a pair of spaced magnetic coils connected electrically in series.

4. The combination of claim 1, wherein the magnetic means comprises a U-shaped permanent magnet.

5. The combination of claim 1, wherein additional magnetic means straddles the collecting portion to throw the liquid metal back into the closed-circuit condition.

6. The combination of claim 5, wherein the additional magnetic means comprises a pair of coils connected electrically in series.

7. The combination of claim 5, wherein the additional magnetic means comprises a permanent magnet.

8. The combination of claim 1, wherein the movable electrode includes a lower boot-shaped portion for additional surface contact with the conducting liquid.

References Cited

UNITED STATES PATENTS

| | | | |
|---|---|---|---|
| 1,948,687 | 2/1934 | Swinne | 200—152 |
| 2,158,009 | 5/1939 | Hufnagel | 335—51 |
| 2,247,493 | 7/1941 | Harrison et al. | 335—51 |
| 2,312,672 | 3/1943 | Pollard | 200—152.9 XR |
| 2,890,310 | 6/1959 | Carlson et al. | 335—51 |
| 3,240,900 | 3/1966 | Halff et al. | 200—152.9 XR |

ROBERT S. MACON, Primary Examiner

U.S. Cl. X.R.

200—166, 144; 335—51